Patented Oct. 13, 1953

2,655,522

UNITED STATES PATENT OFFICE 2,655,522

PROCESS OF PRODUCING MONOESTERS OF POLYHYDRIC ALCOHOL

John David Malkemus, Allendale, N. J., assignor to Colgate-Palmolive-Peet Company, Jersey City, N. J., a corporation of Delaware No Drawing. Application April 25, 1946, Serial No. 664,983

2 Claims. (Cl. 260—410.6)

The present invention relates to a process of producing monoesters of polyhydric alcohols and, more particularly, to a process for reacting fatty acids with di- and trihydric alcohol to produce monoesters.

It is known that the reaction between a fatty acid and an alcohol proceeds according to the equation:

$$RCOOH + R_1OH \leftarrow RCOOR_1 + H_2O$$

in which R represents a long chain aliphatic radical and $R_1$ a short chain aliphatic radical with or without hydroxyl substituents. Being a reversible reaction, it proceeds only to a condition of equilibrium at which the rate of the esterification reaction just equals the rate of the hydrolysis reaction. The equilibrium point depends upon a number of factors, the most important being the relative amounts of fatty acid and alcohol in the starting materials, and the temperature at which the reaction is carried out. The rate of reaction can be increased, i. e., the time from initiation of the reaction until equilibrium is reached can be decreased, by the use of a catalyst. The reaction can be forced toward completion by removal of the water from the reaction mixture.

When a polyhydroxy alcohol is employed in the esterification, one or more of the hydroxyl groups may theoretically be esterified. It has been stated in the literature that the direct reaction of polyhydric alcohols with fatty acids is the oldest recorded and probably the simplest way in which to make polyhydric alcohol esters, that among its advantages are simplicity of the equipment, operation and control, but that this process has several disadvantages. The progress of the reaction is slow at low temperatures and either prolonged heating or high temperatures are required to carry the reaction to equilibrium. It cannot be used, therefore, when there is danger of undesirable chemical changes, such as polymerization, dehydration, rosinification, or charring, in any of the materials present in the reaction mixture. The greatest disadvantage of the method is observed when polyhydric alcohols are to be only partially esterified. It has been reported that in such cases mixtures of more and less completely esterified polyhydric alcohols form, even if the alcohol is employed in large molal excess. Various improvements in the method have been suggested, such as the use of catalysts to speed up the reaction and/or lower the temperature of the reaction, use of solvents for the fatty acids and the alcohol, and improved methods of agitation of the reactants, e. g., by the passage of currents of inert gas.

Despite the progress that had been made, there were still numerous disadvantages of the prior process, among which were low percentage yield of the desired partial esters, particularly monoesters, high free fatty acid content, darkening of the product, and contamination with catalyst.

I have discovered a process of producing partial esters, particularly monoesters of polyhydric alcohols which yield a high percentage of the desired esters of good color and low free fatty acid content.

Generally speaking, the process of the present invention comprises liquid phase esterification of polyhydric alcohol having a maximum of three hydroxyl groups with carboxylic acid in the absence of catalysts at an elevated temperature and under controlled pressure with practically complete removal of water from the system. A molal excess of polyhydric alcohol preferably is employed where a high yield of monoester is desired. After the reaction is complete the excess alcohol may be removed from the reaction mixture, advantageously by distillation under vacuum. Under the conditions of the present process, there is substantially no reversal of the reaction or formation of polyesters during distillation of the excess alcohol from the reaction mixture and, in fact, the monoesters themselves produced by the present process may be distilled without any substantial formation of di- or polyesters during the distillation.

Among the polyhydric alcohols that may be employed in the present process are the diols, such as ethylene glycol, diethylene glycol, propylene glycol, dipropylene glycol, trimethylene glycol, butane diols, etc.; and triols, such as glycerol, butane triols, etc. The polyhydroxy alcohols contemplated by the present invention may be described as short chain aliphatic di- and trihydroxy alcohols having from two to about six carbon atoms per molecule, and the invention has particular utility when used with polyhydric alcohols having two to four carbon atoms per molecule with two to three hydroxy groups.

Any monocarboxylic acid, including aliphatic (such as fatty acids), alicyclic (such as resin acids) and aromatic (such as benzoic acid), may be used in the process of the present invention. The process has greatest utility when aliphatic acids having from six to about twenty carbon atoms per molecule are used, particularly those derived from natural oils and fats, including caprylic, caproic, capric, lauric, myristic, palmitic, stearic, oleic, linoleic and linolenic acids. These acids may be used in substantially pure form or they may be used in mixtures, e. g., the hydrolysis reaction product obtained by splitting natural oils and fats, such as coconut oil, palm kernel oil, palm oil, castor oil, linseed oil, tallow, fish oils, etc.

The temperature of the reaction may vary within a considerable range provided the pressure is properly controlled and correlated with the temperature. Generally speaking, the reaction temperature will fall within the range of about 200° to 300° C. or even higher. Below 200° C. the rate of reaction is too slow for most commercial applications and it is preferred to operate at a temperature of at least about 220° C. Above 300° C. there is a strong tendency toward discoloration of the reaction product unless the time of reaction is very short. A short reaction time can readily be achieved in properly designed apparatus for continuous operation of the process.

The time required for the esterification reaction is largely dependent upon the temperature employed, the time varying roughly inversely with respect to the temperature, i. e., at low temperatures a longer reaction time is necessary than at higher temperatures. Generally speaking, the heating of the materials for the esterification step of the process should not be continued after the reaction has reached its end point as prolongation of the heating thereafter may result in unnecessary darkening of the product.

The percentage of monoester in the alcohol free reaction product depends largely upon the molal ratio of the fatty acids and polyhydric alcohol in the reaction mixture. Using a 1 to 1 ratio of glycol and fatty acid, for example, the per cent monoester in the fatty acid free product after removal of excess alcohol is about 68. With a 2 to 1 ratio of glycol to fatty acid the per cent monoester is about 82; with a 5 to 1 ratio, the per cent monoester is about 90; and with a 10 to 1 ratio, about 93%. The same general results are obtained using glycerol and other of the polyhydric alcohols contemplated by the present invention.

The pressure is controlled and correlated with the temperature to maintain sufficient alcohol in liquid phase to give the desired molal ratio of alcohol to fatty acid in the reaction mixture. In the early stages of the esterification when the presence of water in the reaction mixture does not seriously interfere with the progress of the reaction, the pressure may be as high as or even higher than the vapor pressure of the liquids at the temperature of reaction. At such pressures water is largely or entirely retained in the system and a fatty acid free product would not be obtained. In order to obtain a product very low in or free of fatty acid, water must be bled from the system at least in later stages of the esterification step, and this may be done continuously or in one or more stages. In order to eliminate all water from the reaction mixture it is necessary to control the pressure so that the boiling point of the alcohol in the mixture in anhydrous condition coincides with the temperature of the reaction mixture. In other words, the pressure at the end of the reaction must not be higher than the vapor pressure of the polyhydric alcohol present at the temperature of the reaction mixture. In this way some of the alcohol will be evaporated from the mixture but the removal of all of the water can thereby be assured.

It is desirable to agitate the liquid mass during reaction where the components are immiscible. This may be accomplished by stirring or other mechanically induced agitation, by blowing in steam or inert gas, etc.

After the reaction has been completed the esters are separated from the excess polyhydric alcohol. The esters being substantially insoluble in water while the alcohol is water soluble, an easy way of ridding the esters of excess alcohol is to cool the reaction mixture and wash with water. This method results in dilution of the alcohol so that it cannot be reused without concentration. In some cases, e. g., where glycerol is used, the esters and alcohol are not miscible at room temperature and most of the alcohol will settle in a lower layer if the reaction mixture is cooled and allowed to stand. This permits recovery of most of the alcohol in condition for direct reuse. By washing the upper layer with water, the small amount of alcohol that remains in it after settling can readily be removed. In other cases, e. g., where propylene glycol is used, there is substantially no separation of the reaction mixture into layers at room temperature and in such cases gravity separation of excess alcohol cannot be carried out without refrigeration.

A preferred method of removing the excess polyhydric alcohol from the reaction mixture is to subject the entire reaction mixture to distillation, preferably under reduced pressure. The distillation can be successfully carried out on the reaction product of the present invention without any substantial tendency for monoesters to react and form polyesters. In fact, in most cases the monoesters themselves can be successfully distilled at low pressure within the range of about 1 to 10 mm. of mercury absolute with very little, if any, formation of di- or higher esters. This is believed to be due to the absence of catalysts in the reaction mixture. If the starting acids should contain any catalytic material, as might be the case, for example, where fatty acids are obtained by splitting soap with a mineral acid, the catalyst must be removed before distillation and preferably before the esterification. In this way, the monoesters in very high purity and substantially free from higher esters are readily obtained.

The following examples will illustrate the process of the present invention and some of the outstanding advantages thereof. It is to be understood, however, that the examples are for the purpose of illustrating and not limiting the invention.

*Example I*

310 parts by weight of the fatty acids obtained from coconut oil and 520 parts by weight of propylene glycol are heated in a stainless steel bomb about two hours at a temperature within the range of about 250° to 260° C. and at a gauge pressure of about 70 pounds per square inch. During this time water is bled from the bomb as vapor and condensed, yielding a total of about 100 parts of distillate. Excess glycol is then distilled from the reaction mixture at a temperature of about 150° C. and a pressure of about 5 mm. of mercury absolute. The residue is found to contain only about 0.11% free fatty acids and about 90% propylene glycol monoesters of coco fatty acids of good color.

Example II 405 parts by weight of stearic acid and 465 parts by weight of ethylene glycol are heated in a stainless steel bomb for about two hours at about 245° to 255° C. During about the first thirty minutes the materials are agitated. The gauge pressure, which is maintained at about 65 pounds per square inch during this half hour, is slowly reduced by bleeding off water and glycol from the system. The refractive index of the distillate gradually rises from an initial value of 1.3555 to 1.4280, a total of about 100 parts being collected. The refractive index of pure anhydrous ethylene glycol is 1.4318. Unreacted glycol is removed by distillation under reduced pressure, the liquid being heated to a maximum of 140° C. at about 1.0 mm. of mercury absolute. The product remaining is a white solid (M. P. 55° C.) comprising about 90.5% ethylene glycol monostearate and only about 0.07% free stearic acid.

Example III 135 pounds of double pressed stearic acid and 299 pounds of 96.5% diethylene glycol (about 10 pounds of water) are charged into a jacketed Dowtherm heated reaction vessel. The upper part of the vessel is connected to a vacuum system through a vapor line and condensers. A product outlet at the bottom of the vessel is connected with a cooling coil. With the vapor line and product outlet closed, the vessel is heated to about 255° C. and held at this temperature for about two hours. The pressure is kept under 30 pounds per square inch gauge and is reduced to less than 10 pounds as soon as possible after reaction begins by bleeding off water vapor through the vapor line. The end of the reaction is determined by free fatty acid titration. When the reaction is complete the excess diethylene glycol is distilled off. This is done by shutting off the Dowtherm vapor line and the vessel vapor line. Vacuum is put on the condensers and the vessel vapor line slowly opened until a distillation rate of about 150 pounds per hour is attained. When the temperature drops to about 180° C. the Dowtherm vapor line is opened so as to enable the temperature to be held at about 150° C. until the distillation is complete. Toward the end of the distillation the temperature will start to rise and it is permitted to go to about 160° C. when the Dowtherm vapor line is closed. After holding under vacuum for half an hour under these conditions, the product is removed through the cooling coil by blowing out with steam. The cooling water is held at approximately 130° F. There are obtained about 180 pounds of product which is largely diethylene glycol monostearate and about 234 pounds of diethylene glycol which is recovered as a 66% aqueous solution. The latter is used in the next batch as part of the charge. The product is a white waxy solid (M. P. about 40° C.) having a soft plastic, almost rubbery consistency over a considerable temperature range both above and below room temperature. It is useful as a plasticizer for soaps, waxes, rubber, cosmetics, etc.

Example IV

Fatty acids obtained by splitting coconut oil are distilled and fractionated into a fraction containing the acids lower than lauric acid and a fraction containing the lauric and higher fatty acids. The latter fraction is heated with about 5 to 10 mols of glycerol at about 240° C. to 255° C. for about two hours. The pressure, which is atmospheric at the start of the heating, is reduced toward the end of the reaction to about 100 mm. until substantially anhydrous glycerine is being distilled. The product is then cooled and permitted to settle into a lower glycerine layer and an upper ester layer. The glycerine layer is reused in the next batch. The upper layer, because of its very high monoester content, dissolves about 25% of glycerol, but, since it is present as a true solution, the product, when molten, is a clear homogeneous liquid and may be used for many purposes without removal of the glycerine. It is highly surface active, a trace in water, in which it is almost insoluble, being sufficient greatly to accelerate the wetting of greasy and water-repellent surfaces. Being edible, the product can be used as a wetting agent in sugar coated pills, chocolate, etc.; as a blending agent in margarine, mayonnaise, etc. The unpleasant after-taste often associated with coconut oil products is eliminated by this process. Other oils of the same class, such as palm kernel oil, babassu oil, etc., can be treated to advantage in the same way.

The upper layer may be further treated, if desired, to remove the glycerine. It may, for example, be washed with brine and/or distilled. In the removal of the glycerine by distillation there is no substantial disproportionation and the final product has high monoester content with free fatty acids well under 0.5%, usually about 0.1%.

The process may be carried out continuously by feeding proportioned streams of the carboxylic acid and the polymeric alcohol into a reaction zone, e. g., a heated reaction coil in which the necessary pressure is maintained, continuously discharging the reaction mixture from the reaction zone into a flash chamber at lower pressure for removal of water, repeating the heating and flash distillation cycle one or more times, continuously withdrawing the liquid residue from the last flash chamber and subjecting it to lower pressure to distill off the unreacted polyhydric alcohol. The following example illustrates how the process may be carried out continuously:

Example V

Coconut oil fatty acids and propylene glycol are continuously fed from separate storage tanks into a reaction coil by means of proportioning pumps in a weight ratio of one part acids to two parts glycol. The reaction coil is heated to about 300° C. and has a back pressure valve adapted to maintain the necessary pressure in the coil of about 200 pounds per square inch gauge. The heated materials discharge continuously into a flash chamber at about 60 pounds per square inch pressure where the majority of the water of reaction and a minor amount of glycol distill from the system. The liquids withdrawn from the flash chamber flow through a second reaction coil at 275° C. and discharge into a second flash chamber at atmospheric pressure. The liquid residue withdrawn from this chamber passes through a third coil heated at 250° C. into a third flash chamber at about 20 mm. of mercury absolute where excess propylene glycol is removed. The ester residue, which is light in color, contains about 85% monoester and only about 0.1% free fatty acids.

Instead of repeating the heating and flash distillation cycle, an alternative method is to pass the materials from the first reaction coil into a fractionating column equipped with a reboiler. The column operates at about 60 pounds per square inch gauge pressure and 250° C. Water vapor is withdrawn from the top of the column and a liquid mixture of ester and glycol is drawn off near the bottom. The mixture is flashed into a chamber at about 20 mm. pressure to remove excess propylene glycol. The product has about the same composition and properties as the material produced in the series of reaction coils and flash chambers.

Although the present invention has been described with reference to particular embodiments and examples, it will be apparent to those skilled in the art that variations and embodiments of this invention can be made and that equivalents can be substituted without departing from the principles and scope of the invention.

I claim:

1. The continuous process of producing monoesters of di- and trihydric alcohols with monocarboxylic acids having at least six carbon atoms per molecule which comprises continuously introducing the alcohol and acid free from catalysts into a reaction zone in a ratio of about 4 to 10 mols of alcohol per mol of carboxylic acid, subjecting the mixture in the reaction zone to a temperature within the range of about 200° to 300° C. and a pressure which is controlled and correlated with said temperature to keep the alcohol in liquid phase, continuously removing liquid reaction product from said zone and flashing off water, repeating the heating and flashing until the system is substantially free of unesterified fatty acid and water, and continuously distilling off unreacted alcohol from the anhydrous residue.

2. The process of producing monoglycol esters of fatty acids containing from six to twenty carbon atoms per molecule which comprises heating a mixture consisting of glycol and said acids in a molar ratio of at least 4:1 at a temperature within the range of 200° to 300° C. and superatmospheric pressure to maintain the glycol in liquid phase, removing water from the system before termination of said heating by pressure control, and thereafter distilling excess glycol from the reaction product.

JOHN DAVID MALKEMUS.

References Cited in the file of this patent

UNITED STATES PATENTS

| Number | Name | Date |
|---|---|---|
| 844,426 | Twitchell | Feb. 19, 1907 |
| 1,881,563 | Held et al. | Oct. 11, 1932 |
| 2,077,371 | Rheineck et al. | Apr. 13, 1937 |
| 2,320,844 | Black | June 1, 1943 |